Jan. 13, 1959    H. BERTSCH ET AL    2,867,971
SELF-WINDING MECHANISM, MORE ESPECIALLY FOR WRIST WATCHES
Filed June 21, 1954    2 Sheets-Sheet 1
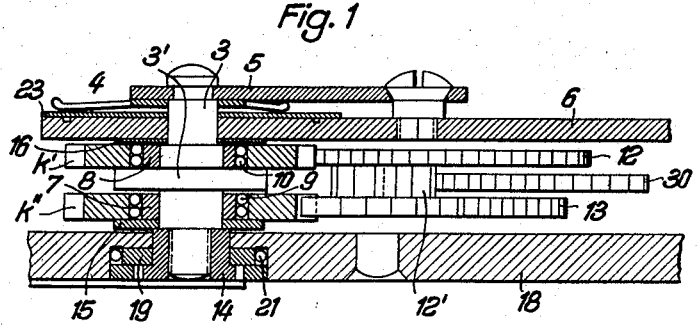
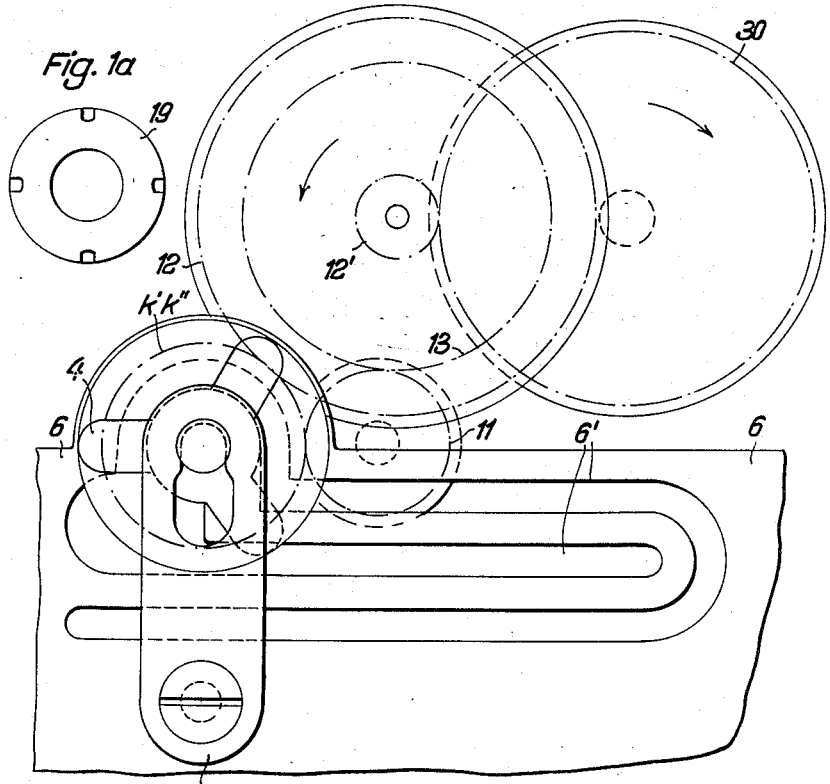
Inventors
H. Bertsch
E. Stein
By Glascock Downing Rublee
Attys.

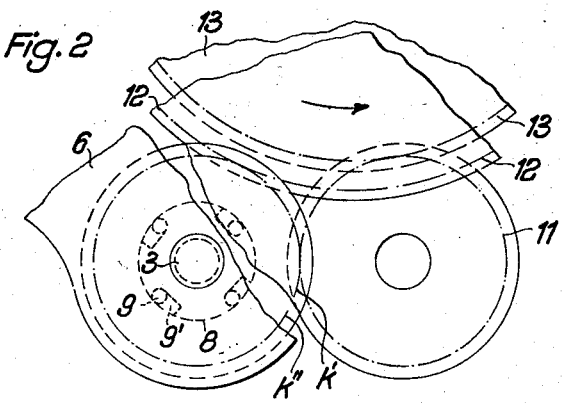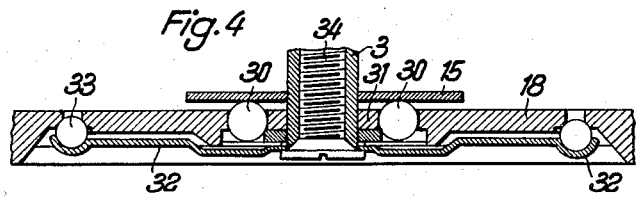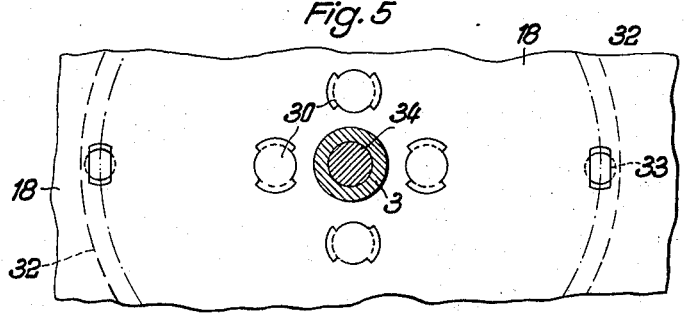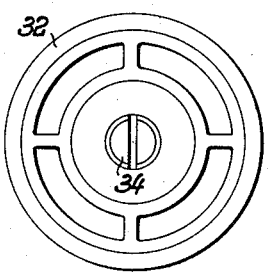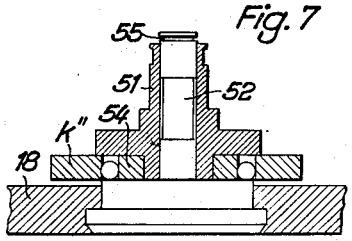

United States Patent Office 2,867,971
Patented Jan. 13, 1959

2,867,971

SELF-WINDING MECHANISM, MORE ESPECIALLY FOR WRIST WATCHES

Hans Bertsch and Ernst Stein, Schwenningen (Neckar), Germany, assignors to Friedrich Mauthe G. m. b. H., Schwenningen (Neckar), Germany Application June 21, 1954, Serial No. 438,202

Claims priority, application Germany June 23, 1953

1 Claim. (Cl. 58—82)

Many self-winding mechanisms for wrist watches and pocket watches are known; they usually operate with a balance weight which transmits its swinging movements or rotations in both directions alternately to the spring arbor, for example, by way of couplings, rocker members and the like. Freewheel clutches are also used, in which case the freewheel gearing does not operate directly on the spring arbor, but by way of an interposed intermediate wheel, in order to deflect the opposite swinging movement of the weight into the direction for winding the spring arbor, as is general practice in connection with such gears. With the rocker drive, an intermediate pinion is coupled alternately with the drive of the spring housing, either directly or by way of the intermediate wheel. The clutches which are built in are mounted independently of the balance weight, whereby the assembly of the self-winding mechanism is very flexible, and therefore the friction loss is considerable and the mounting in the watch movement is rendered difficult.

The invention substantially simplifies the construction of those parts of the watch movement which are required for the mounting of the balance weight and its gearing by the fact that the balance weight and freewheel clutches are mounted on the same arbor. This provides a very compact assembly. The possibility of being able easily to remove the balance weight and the clear vision thereby obtained of the entire winding arrangement provide substantial advantages in the mounting and in connection with repairs with the self-winding mechanism according to the invention. By a yieldable mounting of the balance weight on its arbor, the idle travel of the weight is obtained without it being necessary to provide separate auxiliary means in order to prevent overwinding of the winding spring. At the same time, a shock-absorbing means is thereby provided for the weight. By means of a projecting foot bearing for the weight arbor, a double bearing therefor becomes superfluous.

The drawing illustrates constructional examples of the invention.

Figure 1 is a longitudinal section through the winder mechanism;

Figure 1a is a detail thereof;

Figure 2 is a fragmentary plan view of the balance weight and its connection to the intermediate pinion, shown diagrammatically and on an enlarged scale as in Figure 1;

Figure 3 is a plan view of another form of the balance weight;

Figure 4 is a section through another form of the mounting for the balance weight;

Figure 5 is a fragmentary plan view thereof; and

Figure 6 is a detail thereof in elevation;

Figure 7 shows a third example of the mounting for the balance weight in vertical section.

The weight arbor 3 is mounted in a base plate 18 by means of a ball bearing 21, this being effected by means of the screw-threaded bushing 14 and the wide bearing ring 19, in order to give the arbor a satisfactory support which renders a second mounting superfluous. Two rows of balls 9 and 10 are fitted on both sides of a collar 3' of the arbor 3 between two sealing discs 15 and 16, and the bearing rings 7 and 8 connected to the arbor 3 are formed in opposite directions with the wedge-shaped tracks 9' which are usual with freewheel gears, so that the two outer rings k' and k'' in the form of toothed wheels are driven in opposite directions, each only being driven in one of the two directions of rotation.

The balance weight 6 is placed loosely on the arbor 3 above the disc 16 and is connected to the arbor by a bridge 5 with the interposition of a star-shaped spring 4 with a friction disc 23. The spring 4 is of such dimensions that the weight 6 has a driving action in both directions of rotation, but slides on its arbor 3 and therefore acts as a slipping clutch upon resistance being set up when the winding of the watch movement spring has been effected.

The intermediate wheels 12 and 13 mounted adjacent the arbor 3 form a gear wheel in conjunction with their intermediate pinion 12'. According to Figure 1, the toothed crown wheel k' meshes directly with the larger wheel 12, so that the gear wheel (12, 12', 13) is driven in a counterclockwise direction as indicated by the arrow when the balance weight 6 is swung in a clockwise direction, as viewed in Figures 2 and 3, the balls 10 binding between the ring 8 and the toothed wheel k'. The bearing ring 7 then runs idly. The wheel k'' may remain stationary with the intermediate wheel 11. By means of the pinion 12', which meshes with the toothed wheel 30 connected to the arbor, the said wheel 30 is rotated clockwise.

If the weight 6 swings in a counterclockwise direction, that is to say, pivots towards the left, the balls 9 are jammed between the ring 7 and the toothed wheel k''. The intermediate wheel 11 meshing with the latter is rotated in a clockwise direction and drives the gear wheel (12, 12', 13) in the same direction as before, i. e. in a counterclockwise direction. The upper toothed wheel k' is then stationary and the arbor on which the toothed wheel 30 is carried is also rotated clockwise as before and the watch spring is also wound.

As will be seen more particularly from Figure 3, the balance weight 6 comprises cut-outs 6' in order resiliently to take up axial shocks and also shocks transversely of the axis.

Figures 4 to 6 show another example of the mounting of the weight arbor 3. According to these figures, the arbor 3 is held in the base plate 16 by a screw 34 with interposition of a bottom disc 32. The disc 32 is supported by the balls 33 on the base plate 18. Four balls are sufficient but it is also possible to provide more. The disc 15 which is carried by the arbor 3 and which secures the wheel k'' is tightened against the balls 30 so that in this manner a yieldable mounting without clearance is produced which at the same time permits easy movement of the weight arbor 3, which is moreover supported over a wide area.

A third form of the mounting of the weight arbor 3 is shown in Figure 7. Fixed in the supporting plate 18 is a post or pin 52 on which the hollow arbor 51 of the balance weight is rotated. Arranged on this hollow arbor 51 are the coupling wheels k' and k'' and also the other elements as in Figure 1. The bottom limit of the weight arbor 51 is formed by the bearing ring 54 and the upper limit is obtained by a latch inserted into the groove 55 of the pin 52.

The movable connection of the balance weight to the movement always permits only a limited force to be applied to the watch spring and excludes the possibility of overwinding. On the other hand, in conjunction with the resilient construction of the weight itself, the movable connection also permits of it being supported on the watch movement or housing with shocks in all directions. The complete winding mechanism is adapted to be satisfactorily inspected without removing the balance weight or bridges.

We claim:

A self-winding mechanism for wrist watches comprising a base plate, an arbor, means for supporting the lower end of said arbor in said base plate including a ball bearing supported in said base plate and a bushing threaded on said end of the arbor and engaging said ball bearing, a collar mounted on the arbor intermediate its ends, two toothed crown wheels mounted one above and one below said collar, two unidirectional ball clutches each interposed between said arbor and a respective one of said toothed crown wheels and adapted to couple one of said wheels to the arbor only during rotation of the arbor in one direction and to couple the other wheel to the arbor only during rotation of the arbor in the other direction, transmission means operatively engaging said crown wheels for transmitting the rotary movements of said crown wheels resulting from rotation of the arbor to a winding gear of a spring casing so that said winding gear is always rotated in the same direction independently of the direction of rotation of the arbor, a balance weight, and slip friction clutch means coupling said balance weight to the upper unsupported end of the arbor immediately adjacent one of said toothed crown wheels adapted to act for both directions of rotation of the arbor; said friction clutch means comprising a bridge rigidly connected at one end to the balance weight and having its other end rotatable about the upper end of the arbor, and a star-shaped spring and a friction disc located on the arbor between the said other end of the bridge and the balance weight.

References Cited in the file of this patent

UNITED STATES PATENTS

| | | |
|---|---|---|
| 2,563,112 | Hill et al. | Aug. 7, 1951 |
| 2,571,878 | Hill et al. | Oct. 16, 1951 |

FOREIGN PATENTS

| | | |
|---|---|---|
| 155,515 | Switzerland | Sept. 16, 1932 |
| 170,938 | Switzerland | Nov. 1, 1934 |
| 242,384 | Switzerland | Feb. 1, 1947 |
| 286,563 | Switzerland | Feb. 16, 1953 |